United States Patent [19]
Chase

[11] 3,886,141
[45] May 27, 1975

[54] PREPARATION OF 5-PYRIDYL BENZODIAZEPINE UTILIZING HEXAMETHYLENETETRAMINE

[75] Inventor: George Oswald Chase, Hawthorne, N.J.

[73] Assignee: Hoffmann-La Roche Inc., Nutley, N.J.

[22] Filed: July 17, 1972

[21] Appl. No.: 272,255

Related U.S. Application Data

[63] Continuation of Ser. No. 187,500, Oct. 7, 1971, abandoned.

[52] U.S. Cl. ... 260/239.3 D; 260/295 AM; 260/999
[51] Int. Cl............................................. C07d 53/06
[58] Field of Search........................... 260/239.3 D

[56] References Cited
UNITED STATES PATENTS
3,371,085  2/1968  Reeder et al. ............... 260/239.3 D
FOREIGN PATENTS OR APPLICATIONS
7,001,765  4/1971  Netherlands................. 260/239.3 D

OTHER PUBLICATIONS

Archer et al., Chemical Reviews Vol. 68, No. 6, pages 755–756, (1968).

Migrdichian, "Organic Synthesis," Vol. 1, pages 467, 468, 505, (Reinhold), (1957).

Blazevic et al., "J. Het. Chem.," Vol. (7), pages 1173–1174, (1920).

Primary Examiner—Henry R. Jiles
Assistant Examiner—Robert T. Bond
Attorney, Agent, or Firm—Samuel L. Welt; Bernard S. Leon

[57] ABSTRACT 5-(2-Pyridyl)-1,4-benzodiazepin-2-ones are prepared via the reaction of haloacetamido benzoyl pyridines with hexamethylenetetramine. The 2-pyridyl benzodiazepines are known muscle relaxants and anticonvulsants.

6 Claims, No Drawings

PREPARATION OF 5-PYRIDYL BENZODIAZEPINE UTILIZING HEXAMETHYLENETETRAMINE

CROSS REFERENCE TO RELATED APPLICATION

This application is a continuation of application Ser. No. 187,500, filed Oct. 7, 1971, now abandoned.

PERTINENT PRIOR ART

In the *Journal of Heterocyclic Chemistry*, 7, 1173 (1970), the preparation of 5-phenyl-1,4-benzodiazepines utilizing hexamethylenetetramine is disclosed.

DETAILED DESCRIPTION OF THE INVENTION

The present invention contemplates the preparation of compounds of the formula

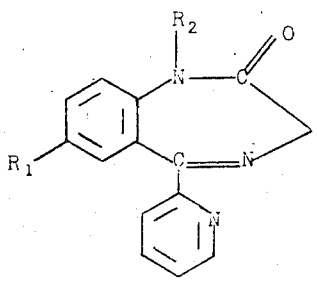

I wherein $R_1$ is selected from the group consisting of hydrogen and halogen and $R_2$ is selected from the group consisting of hydrogen and lower alkyl by the reaction of a compound of the formula

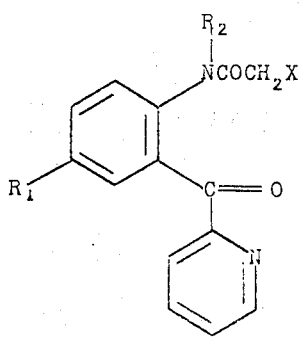

II wherein $R_1$ and $R_2$ are as above and X is selected from the group consisting of chlorine, bromine and iodine
with hexamethylenetetramine.

By the term "lower alkyl" as utilized herein, there is intended straight or branch chained aliphatic hydrocarbon groups such as methyl, ethyl, propyl, butyl and the like. When $R_2$ is lower alkyl, it is preferably methyl. By the term "halogen" as utilized herein all four forms thereof are contemplated, i.e. chlorine, bromine, fluorine and iodine. When $R_1$ is halogen, preferred halogens are chlorine and bromine, with bromine being especially preferred. In the most preferred aspect of this procedure, there is prepared 7-bromo-1,3-dihydro-5-(2-pyridyl)-2H-1,4-benzodiazepin-2-one.

In proceeding from the compound of the formula II to the corresponding compound of the formula I utilizing hexamethylenetetramine, the reaction is suitably effected in the presence of an inert organic solvent. Among the many inert organic solvents suitable for the purposes of the present invention, there can be included alkanols such as methanol, ethanol and the like; ethers, such as tetrahydrofuran and the like, dimethylsulfoxide, dimethylformamide and similar inert organic solvents. All that is required of the solvent is that the starting materials be soluble in the presence thereof and that it not interfere with the ensuing reaction. While temperature and pressure are not critical to a successful performance of the process disclosed herein, it is preferred to effect the reaction at a temperature of from about room temperature to about the reflux temperature of the reaction medium. Most preferably, elevated temperatures are utilized, most suitably a temperature at about the reflux temperature of the reaction medium.

The conversion of a compound of the formula II to the corresponding compound of the formula I is preferably effected utilizing a compound of the formula II in the form of the salt thereof with any conventionally available non-oxidizing acid, e.g. a non-oxidizing mineral acid such as a hydrohalic acid (HBR, HCl, HI and the like) or a non-oxidizing organic acid, such as $C_1$–$C_4$ lower alkanoic acid (acetic, propionic, butyric and the like), toluene sulfonic acid and the like.

Thus, by the technique described above, the art is provided with a facile approach to the pharmaceutically desirable 2-pyridyl benzodiazepin-2-ones.

The following examples are illustrative but not limitative of the present invention. All temperatures are stated in degrees centigrade.

EXAMPLE 1

2-Amino-5-bromobenzoylpyridine, 69.3 gms., in 200 ml. of toluene is reacted with 23.3 mls. of bromoacetyle bromide. The hydrobromide of 2-(2-bromoacetamido-5-bromobenzoyl)pyridine which forms, is separated from the reaction solvent and, without drying, is added to 1.8 liters of ethanol containing hexamethylenetetramine, 78 gms. The reaction mixture is heated under reflux for 10 hours and the solvent is then removed by distillation under reduced pressure from a steam bath. The residue obtained is triturated with 250 mls. of water, while sufficient aqua ammonia is added to bring the pH to 7–8. The crystalline suspension obtained is filtered and the product is washed with water and dried yielding 7-bromo-1,3-dihydro-5-(2-pyridyl)-2H-1,4-benzodiazepin-2-one, m.p. 225° to 235°C., (uncorr.) with decomposition. Crystallization from dimethylformamide/ethanol gives the product with a m.p. of 243° to 245°C., (uncorr.) with decomposition.

In a similar manner as described in Example 1, there can be prepared 1,3-dihydro-5-(2-pyridyl)-2H-1,4-benzodiazepin-2-one m.p. 230°–231°C. dec. from 2-(2-bromoacetamido-benzoyl)pyridine; 7-chloro-1,3-dihydro-5-(2-pyridyl)-2H-1,4-benzodiazepin-2-one, m.p. 224°–225°C. dec. from 2-(2-bromoacetamido-5-chlorobenzoyl) pyridine; 1,3-dihydro-5-(2-pyridyl)-7-bromo-2H-1,4-benzodiazepin-2-one from 2-(2-chloroacetamido-5-bromobenzoyl)pyridine or from 2-(2-iodoacetamido-5-bromobenzoyl)pyridine and 7-bromo-1-methyl-5-(2-pyridyl)-1,3-dihydro-2H-1,4-benzodiazepin-2-one, m.p. 135.5°–137°C. dec. from 2-(2-chloro-N-methylacetamido-5-bromobenzoyl)pyridine.

EXAMPLE 2

2-Amino-5-bromobenzoylpyridine, 69.3 gms., is converted to the hydrobromide of 2-(2-bromoacetamido-5-bromobenzoyl) pyridine as described in Example 1. The hydrobromide is separated from the reaction solvent and without drying is added to 1.8 liters of methanol containing hexamethylenetetramine, 101.1 gms. The reaction mixture is stirred under reflux for 6 hours and the reaction solvent is then removed by distillation from a steam bath under reduced pressure. The crystalline residue so-obtained is suspended in 250 mls. of water, filtered, washed, and dried yielding 7-bromo-1,3-dihydro-5-(2-pyridyl)-2H-1,4-benzodiazepin-2-one, melting at 225° to 235°C. with decomposition (uncorr.). Crystallization from DMF/ethanol gives pure material melting at 243° to 245°C., with decomposition (uncorr.).

EXAMPLE 3

2-(2-Bromoacetamido-5-bromobenzoyl)pyridine, 99.5 gms., and hexamethylenetetramine, 78 gms. are heated under reflux in 1.2 liters of ethanol for 10 hours. The solvent is removed by distillation under reduced pressure from a steam bath. The residue in the still is suspended, with stirring, in 500 mls. of water isolated by filtration and dried yielding 7-bromo-1,3-dihydro-5-(2-pyridyl)-2H-1,4-benzodiazepin-2-one, m.p. 225° to 235°C., with decomposition. Upon crystallization from DMF/ethanol, the product melts at 243° to 245°C., with decomposition (uncorr.).

EXAMPLE 4

2-(2-Bromoacetamido-5-bromobenzoyl)pyridine, 99.5 gms., and hexamethylenetetramine, 78 gms. are heated under reflux in a 70/30 v/v% of methanol and water for 10 hours. The reaction mixture is cooled for crystallization and the product isolated by filtration, washed, and dried. The crude product, 7-bromo-1,3-dihydro-5-(2-pyridyl)-2H-1,4-benzodiazepin-2-one melts in the range 220° to 235°C. with decomposition (uncorr.). Crystallization from DMF/ethanol gives the product melting at 243° to 245°C. with decomposition (uncorr.).

I claim:

1. A process for preparing a compound of the formula:

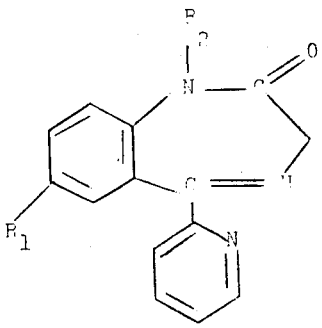

wherein $R_1$ is selected from the group consisting of hydrogen and halogen and $R_2$ is selected from the group consisting of hydrogen which comprises reacting a compound of the formula:

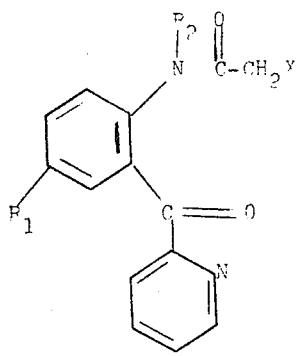

wherein X is selected from the group consisting of chlorine, bromine and iodine and $R_1$ and $R_2$ are as above with hexamethylenetetramine.

2. A process as in claim 1 wherein $R_1$ is bromo, and X is selected from the group consisting of bromine or chlorine.

3. A process as in claim 1 wherein $R_1$ is hydrogen and X is selected from the group consisting of bromine and chlorine.

4. A process as in claim 1 wherein the compound of the formula II is utilized in the form of a salt thereof with a non-oxidizing mineral acid.

5. A process as in claim 4 wherein $R_1$ is bromo and X is selected from the group consisting of bromine or chlorine.

6. A process as in claim 4 wherein $R_1$ is hydrogen and X is selected from the group consisting of bromine and chlorine.

* * * * *